United States Patent
Wang et al.

(10) Patent No.: US 11,669,319 B2
(45) Date of Patent: *Jun. 6, 2023

(54) CREATING AND USING NATIVE VIRTUAL PROBES IN COMPUTING ENVIRONMENTS

(71) Applicant: AT&T Intellectual Property I, L.P., Atlanta, GA (US)

(72) Inventors: Jiansong Wang, Lincroft, NJ (US); Joseph Mueller, Ravensdale, WA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/861,351

(22) Filed: Jul. 11, 2022

(65) Prior Publication Data

US 2022/0342650 A1 Oct. 27, 2022

Related U.S. Application Data

(63) Continuation of application No. 16/792,775, filed on Feb. 17, 2020, now Pat. No. 11,397,573.

(51) Int. Cl.
*G06F 8/61* (2018.01)
*H04L 43/12* (2022.01)
*H04L 67/10* (2022.01)

(52) U.S. Cl.
CPC ............. *G06F 8/63* (2013.01); *H04L 43/12* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 9,860,152 B2 | 1/2018 | Xia | |
| 9,979,602 B1* | 5/2018 | Chinnakannan | H04L 47/803 |
| 11,397,573 B2* | 7/2022 | Wang | H04L 67/10 |
| 11,467,881 B2* | 10/2022 | Thyagarajan | H04L 41/5051 |
| 2016/0094418 A1 | 3/2016 | Raney | |
| 2016/0173357 A1* | 6/2016 | Stokking | H04L 43/10 370/252 |
| 2016/0197799 A1 | 7/2016 | Clemm | |
| 2016/0366041 A1* | 12/2016 | Seenappa | H04L 41/0895 |
| 2017/0104609 A1* | 4/2017 | Mcnamee | H04W 4/24 |
| 2018/0351824 A1 | 12/2018 | Giust | |
| 2019/0028350 A1* | 1/2019 | Yeung | H04L 43/0817 |

OTHER PUBLICATIONS

U.S. Notice of Allowance dated Mar. 9, 2022 in U.S. Appl. No. 16/792,775.

* cited by examiner

*Primary Examiner* — Marina Lee
(74) *Attorney, Agent, or Firm* — Hartman & Citrin LLC

(57) ABSTRACT

Concepts and technologies are disclosed herein for creating and using native virtual probes in computing environments. A request for a service that includes a virtual function can be received, where the virtual function is to be monitored by a native virtual probe. An image of the service can be obtained, where the image can include a first image component for the virtual function and a second image component for the native virtual probe. The image can be deployed. Deployment of the image can result in instantiation of the virtual function on a computing device and instantiation of the native virtual probe on the computing device.

20 Claims, 8 Drawing Sheets

CREATING AND USING NATIVE VIRTUAL PROBES IN COMPUTING ENVIRONMENTS

CROSS-REFERENCE TO RELATED APPLICATIONS

This application is a continuation of and claims priority to U.S. patent application Ser. No. 16/792,775, entitled "Creating and Using Native Virtual Probes in Computing Environments," filed Feb. 17, 2020, now U.S. Pat. No. 11,397,573, which is incorporated herein by reference in its entirety.

BACKGROUND

Network data analytics can serve an important function in maintaining a communications network. For example, raw packet flow data on a control plane associated with a network can be analyzed to gain insight on network call flows through network protocol analyzers. Similarly, raw packet flow data on the user plane can be analyzed to gain insight on the applications, user behaviors, and/or user experiences on the network.

To gain such insights into communications networks, network operators may employ test access points ("TAPs"). These TAPs can include physical inline network devices that can intercept traffic for purposes of analysis. Existing network TAPs, however, are invasive, costly, complex, and limited. In particular, network TAPs can be considered invasive in that these TAPs can be provided as part of a transport network. The network TAPs, though configured as passive devices, can impact optical line signal quality and therefore can require careful engineering by the transport engineers to avoid impacting quality of service between two network endpoints (between which the network TAPs are located).

Similarly, the network TAPs can be considered costly in that networks are currently experiencing exponential growth in terms of the number of devices and/or paths between these devices. Because of the rapid growth in the number of physical interfaces and the number of data analysis devices needed for each network TAP, costs in terms of device and computational cost are increasing rapidly.

Similarly, the network TAPs can be considered complex because network TAPs, as existing in the optical line signaling path, can impact signal (e.g., can cause signal interruptions). Maintenance activities therefore may need to be well-coordinated to minimize the data flow interruption due to optical signal interruptions. Also, the network TAPs can be considered limited in that analytics provided by network TAPs may present only analytics related to network interfaces and therefore may not provide insight to application and/or business logic.

To address these and other shortcomings of physical network TAPs, some providers have proposed using virtual test access points ("vTAPs"). vTAPs can be considered less invasive in that they can exist in the same subnet/LAN as the target virtual function but are not "inline" and therefore do not interfere with application traffic. vTAPs, however, are still costly in that the virtual functions being analyzed by vTAPs can be required to duplicate every packet (i.e., mirroring the traffic) received by the virtual function for providing to the vTAP. Thus, using a vTAP can result in the consumption of CPU cycles for the read, duplicate, and store operations.

Additionally, vTAPs may also require their own compute resources to be implemented. vTAPs also can remain complex in that due to taxing on the CPU cycles, real-time monitoring can require careful/creative engineering to avoid impacting network call processing. Also, vTAPs can still be considered limited in that the vTAPs may only present analytics related to network interfaces and therefore still may not provide any insight into each of the virtual functions themselves and/or the application/business logic. Finally, the data generated by vTAPs and/or traditional network TAPs still can require enormous resources to analyze. In particular, data analysis can be costly and can have limited data retention ability due to the copious amounts of network data arriving from many network interfaces between multiple instances of network functions; large storage requirements due to the required raw data volume, and huge analytic efforts in order to sift through the huge volume of the raw data. In some instances, data may be stored for less than a week due to these and/or other constraints.

SUMMARY

The present disclosure is directed to creating and using native virtual probes in computing environments. According to various embodiments of the concepts and technologies disclosed herein, the native virtual probes illustrated and described herein can obviate the need for dedicated probe deployment resources as the native virtual probes can be deployed with the deployment of virtual functions. The native virtual probes can provide selective data analytics, thereby saving compute and storage resources that would be required for untargeted analysis of the data. The native virtual probes of the concepts and technologies disclosed herein can be fully distributed in the cloud and can enable analyzing data in small chunks to improve efficiency, thereby enabling network interface data collection and network function business logic insights.

An instantiation device (or an instantiation service) can receive a request for a service or application. The request for the service or application can be created via a portal, received via an API, and/or otherwise made with and/or received by the instantiation service. The instantiation service can access one or more service images to obtain an image for the requested service. According to various embodiments of the concepts and technologies disclosed herein, the requested service can include a virtual function and a native virtual probe, which can include a test access point and a native analytic engine. The instantiation service can be configured to deploy the image to the computing environment, or to trigger or cause other devices to deploy the image to the computing environment, to create the service. The virtual function that is deployed can include an image of the native virtual probe according to various embodiments of the concepts and technologies disclosed herein. It should be understood that this example is illustrative, and therefore should not be construed as being limiting in any way.

The native virtual probes can be configured to operate in the service, in some embodiments; in the same computing environment as the service operates in; and/or otherwise in communication with and/or having access to a memory in which traffic data associated with the service (or at least a virtual function of that service) is stored. According to various embodiments, a global analytic engine can be configured to specify types of traffic data that are to be captured by the native virtual probes. In particular, the global analytic engine can create data requests that specify data, types of data, categories of data, and/or other parameters relating to what data and/or information is to be captured by the native virtual probes. This information can be passed to the computing environment via the network exposure function of the computing device. The information can be used by the native virtual probes (e.g., by modifying the types of data captured by the test access point and/or by modifying what data is analyzed by the native analytic engine). The native analytic engine can analyze the traffic data and provide probe data to the computing device for storage in the data lake.

The global analytic engine can access the data lake and perform analysis on the data in the data lake to obtain insights into network interface information, business logic data, and other information handled by the virtual functions. In particular, the test access points can collect the traffic data, which can be analyzed to determine how traffic flows to, through, and/or from the virtual functions, internal calls at the virtual functions, what business logic operations occur on the data at the virtual functions, and the like. Similarly, the data lake can be analyzed to correlate virtual function call processing events with network interface information (e.g., interface protocol information) to correlate without the use of external correlation engines.

The global analytic engine therefore can be configured to analyze the data lake to generate network event records from the correlated raw data, to generate state machine event records from virtual function business logic (e.g., call processing stack and/or state machine information), to correlate both types of event data records to generate a holistic view of network events at some time. For example, correlated insights can expose internal call processing business logic flaws during code development to detect failures, etc.

The native virtual probes illustrated and described herein can include an onboard test access point inside the virtual function software components, as well as a native analytic engine inside the virtual function software components. These two components can collectively provide the functionality of the native virtual probes. Probe insertion (e.g., instantiation of the test access point and the native analytic engine) can be part of the deployment process for a virtual function. As the virtual function grows, e.g., as new instances of the virtual function are deployed, the number of native virtual probes also can grow organically. Because the native virtual probe can be deployed to the same memory that hosts the virtual function, the native virtual probe can have visibility of both related network interface data and internal call processing business logic data. The native virtual probe also can be able to correlate call processing business logic events (at the virtual function) with network interface protocol data without any external devices and/or operations. This approach can save efforts and costs of external correlation engines and prevent potential false conclusion of external correlation engines. It should be understood that this example is illustrative, and therefore should not be construed as being limiting in any way.

The native virtual probes illustrated and described herein can result in reduced cost relative to vTAPs and/or physical TAPs. In particular, the native virtual probes (and the components thereof, the test access points and the native analytic engines) can be provided as software components that can be deployed with the virtual functions. Thus, the native virtual probes illustrated and described herein can require no external probe cost to operate, no external probe growth cost can be expected in the future, and the native virtual probes can provide efficient packet processing and analytics (i.e., no packet duplication or mirroring), thereby realizing savings in computing resources and reduced scaling costs. Also, no external touchpoints are required, no traffic mirroring and/or duplication may be required, and packets may be processed only once per virtual function since the native virtual probe can access the raw data directly from memory.

According to one aspect of the concepts and technologies disclosed herein, a system is disclosed. The system can include a processor and a memory. The memory can store computer-executable instructions that, when executed by the processor, cause the processor to perform operations. The operations can include receiving a request for a service that can include a virtual function, where the virtual function is to be monitored by a native virtual probe; obtaining an image of the service, where the image can include a first image component for the virtual function and a second image component for the native virtual probe; and triggering deployment of the image, wherein deployment of the image can result in instantiation of the virtual function on a computing device and instantiation of the native virtual probe on the computing device.

In some embodiments, the virtual function can be deployed to the memory, the native virtual probe can be deployed to the memory, and the traffic data for the virtual function can be stored in the memory. In some embodiments, the native virtual probe can include a test access point and a native analytic engine. In some embodiments, the test access point can obtain the traffic data by reading the traffic data from the memory without duplicating the traffic data. In some embodiments, the native virtual probe can be used to obtain traffic data associated with the virtual function.

In some embodiments, obtaining the traffic data can include: receiving a data request that defines traffic data to be collected for the virtual function; accessing the traffic data from the memory; analyzing the traffic data; creating probe data; and providing the probe data to a data lake. In some embodiments, analyzing the traffic data can include: obtaining raw data from a control plane of a computing environment; obtaining raw data from a user plane of the computing environment; correlating control plane data and user plane data; and building local call flows for the virtual function based on correlated control plane data and user plane data.

In some embodiments, the computer-executable instructions, when executed by the processor, cause the processor to perform operations further can include: accessing the data lake using a global analytic engine; analyzing the probe data stored in the data lake; and outputting a data analysis result based on the analysis, wherein the global analytic engine accesses the data lake via a network exposure function. In some embodiments, the data request can be obtained via the network exposure function.

According to another aspect, a method is disclosed. The method can include receiving, at an instantiation device, a request for a service. The service can include a virtual function. The virtual function is to be monitored by a native virtual probe. The method also can include obtaining, by the instantiation device, an image of the service. The image can include a first image component for the virtual function and a second image component for the native virtual probe. The method also can include triggering, by the instantiation device, deployment of the image. Deployment of the image can result in instantiation of the virtual function on a computing device and instantiation of the native virtual probe on the computing device.

In some embodiments, the virtual function can be deployed to the memory, the native virtual probe can be deployed to the memory, and the traffic data for the virtual function can be stored in the memory. In some embodiments, the native virtual probe can include a test access point and a native analytic engine. The test access point can obtain the traffic data by reading the traffic data from the memory without duplicating the traffic data. In some embodiments, obtaining the traffic data can include: receiving a data request that defines traffic data to be collected for the virtual function; accessing the traffic data from the memory; analyzing the traffic data; creating probe data; and providing the probe data to a data lake.

In some embodiments, analyzing the traffic data can include: obtaining raw data from a control plane of a computing environment; obtaining raw data from a user plane of the computing environment; correlating control plane data and user plane data; and building local call flows for the virtual function based on correlated control plane data and user plane data. In some embodiments, the method also can include accessing the data lake using a global analytic engine; analyzing the probe data stored in the data lake; and outputting a data analysis result based on the analysis, wherein the global analytic engine accesses the data lake via a network exposure function.

According to yet another aspect of the concepts and technologies disclosed herein, a computer storage medium is disclosed. The computer storage medium can store computer-executable instructions that, when executed by a processor, cause the processor to perform operations. The operations can include receiving a request for a service that can include a virtual function, where the virtual function is to be monitored by a native virtual probe; obtaining an image of the service, where the image can include a first image component for the virtual function and a second image component for the native virtual probe; and triggering deployment of the image, wherein deployment of the image can result in instantiation of the virtual function on a computing device and instantiation of the native virtual probe on the computing device.

In some embodiments, the virtual function can be deployed to the memory, the native virtual probe can be deployed to the memory, and the traffic data for the virtual function can be stored in the memory. In some embodiments, the native virtual probe can include a test access point and a native analytic engine. The test access point can obtain the traffic data by reading the traffic data from the memory without duplicating the traffic data.

In some embodiments, obtaining the traffic data can include: receiving a data request that defines traffic data to be collected for the virtual function; accessing the traffic data from the memory; analyzing the traffic data; creating probe data; and providing the probe data to a data lake. In some embodiments, analyzing the traffic data can include: obtaining raw data from a control plane of a computing environment; obtaining raw data from a user plane of the computing environment; correlating control plane data and user plane data; and building local call flows for the virtual function based on correlated control plane data and user plane data.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
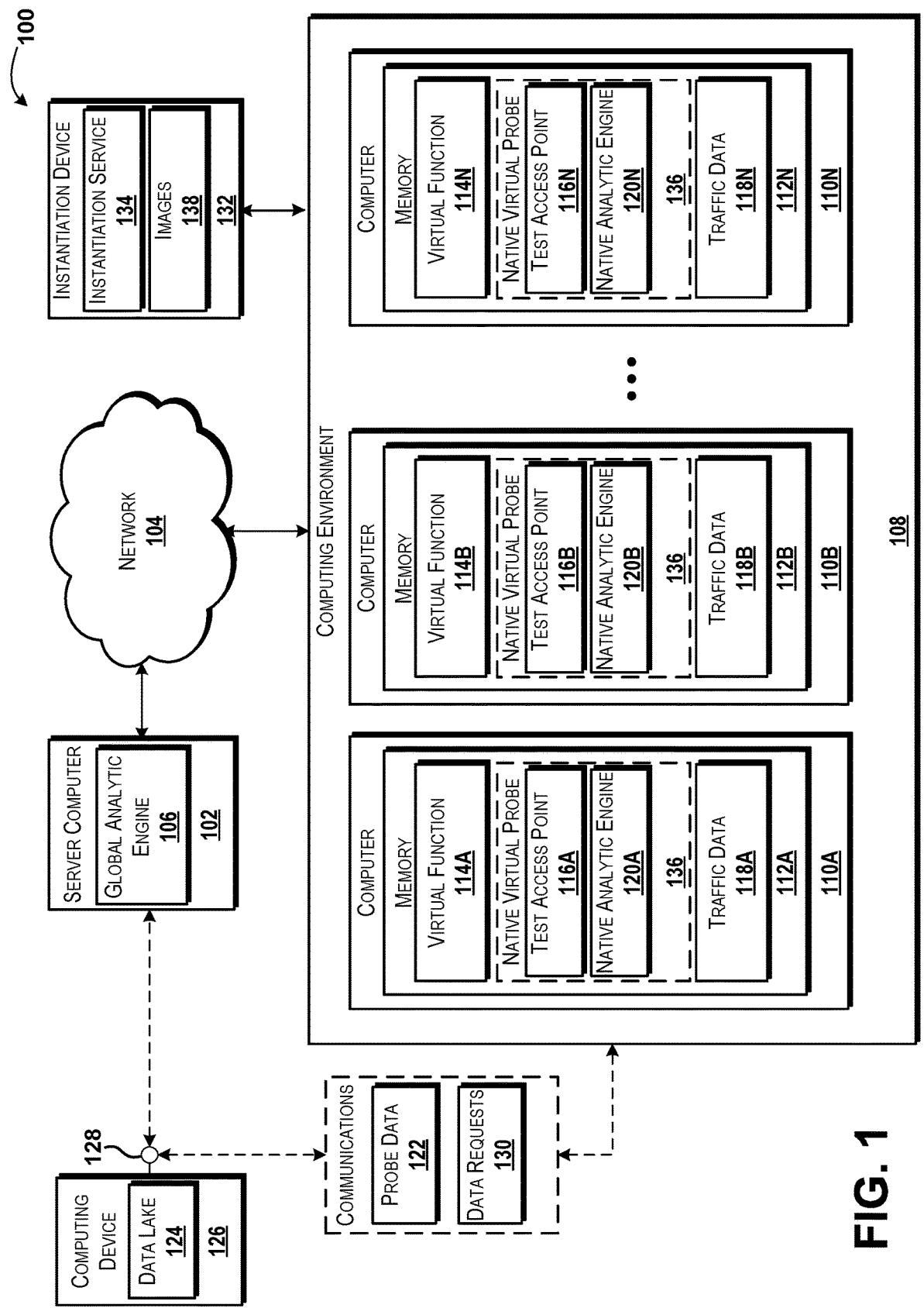
FIG. 1 is a system diagram illustrating an illustrative operating environment for various embodiments of the concepts and technologies described herein.

The following detailed description is directed to creating and using native virtual probes in computing environments. An instantiation device (or an instantiation service) can receive a request for a service or application. The request for the service or application can be created via a portal, received via an API, and/or otherwise made with and/or received by the instantiation service. The instantiation service can access one or more service images to obtain an image for the requested service. According to various embodiments of the concepts and technologies disclosed herein, the requested service can include a virtual function and a native virtual probe, which can include a test access point and a native analytic engine. The instantiation service can be configured to deploy the image to the computing environment, or to trigger or cause other devices to deploy the image to the computing environment, to create the service. The virtual function that is deployed can include an image of the native virtual probe according to various embodiments of the concepts and technologies disclosed herein. It should be understood that this example is illustrative, and therefore should not be construed as being limiting in any way.

The native virtual probes can be configured to operate in the service, in some embodiments; in the same computing environment as the service operates in; and/or otherwise in communication with and/or having access to a memory in which traffic data associated with the service (or at least a virtual function of that service) is stored. According to various embodiments, a global analytic engine can be configured to specify types of traffic data that are to be captured by the native virtual probes. In particular, the global analytic engine can create data requests that specify data, types of data, categories of data, and/or other parameters relating to what data and/or information is to be captured by the native virtual probes. This information can be passed to the computing environment via the network exposure function of the computing device. The information can be used by the native virtual probes (e.g., by modifying the types of data captured by the test access point and/or by modifying what data is analyzed by the native analytic engine). The native analytic engine can analyze the traffic data and provide probe data to the computing device for storage in the data lake.

The global analytic engine can access the data lake and perform analysis on the data in the data lake to obtain insights into network interface information, business logic data, and other information handled by the virtual functions. In particular, the test access points can collect the traffic data, which can be analyzed to determine how traffic flows to, through, and/or from the virtual functions, internal calls at the virtual functions, what business logic operations occur on the data at the virtual functions, and the like. Similarly, the data lake can be analyzed to correlate virtual function call processing events with network interface information (e.g., interface protocol information) to correlate without the use of external correlation engines.

The global analytic engine therefore can be configured to analyze the data lake to generate network event records from the correlated raw data, to generate state machine event records from virtual function business logic (e.g., call processing stack and/or state machine information), to correlate both types of event data records to generate a holistic view of network events at some time. For example, correlated insights can expose internal call processing business logic flaws during code development to detect failures, etc.

The native virtual probes illustrated and described herein can include an onboard test access point inside the virtual function software components, as well as a native analytic engine inside the virtual function software components. These two components can collectively provide the functionality of the native virtual probes. Probe insertion (e.g., instantiation of the test access point and the native analytic engine) can be part of the deployment process for a virtual function. As the virtual function grows, e.g., as new instances of the virtual function are deployed, the number of native virtual probes also can grow organically. Because the native virtual probe can be deployed to the same memory that hosts the virtual function, the native virtual probe can have visibility of both related network interface data and internal call processing business logic data. The native virtual probe also can be able to correlate call processing business logic events (at the virtual function) with network interface protocol data without any external devices and/or operations. This approach can save efforts and costs of external correlation engines and prevent potential false conclusion of external correlation engines. It should be understood that this example is illustrative, and therefore should not be construed as being limiting in any way.

The native virtual probes illustrated and described herein can result in reduced cost relative to vTAPs and/or physical TAPs. In particular, the native virtual probes (and the components thereof, the test access points and the native analytic engines) can be provided as software components that can be deployed with the virtual functions. Thus, the native virtual probes illustrated and described herein can require no external probe cost to operate, no external probe growth cost can be expected in the future, and the native virtual probes can provide efficient packet processing and analytics (i.e., no packet duplication or mirroring), thereby realizing savings in computing resources and reduced scaling costs. Also, no external touchpoints are required, no traffic mirroring and/or duplication may be required, and packets may be processed only once per virtual function since the native virtual probe can access the raw data directly from memory.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for creating and using native virtual probes in computing environments will be described, according to an illustrative embodiment of the concepts and technologies disclosed herein. The operating environment 100 shown in FIG. 1 can include a server computer 102. The server computer 102 can operate in communication with and/or as part of a communications network ("network") 104, though this is not necessarily the case in all embodiments.

According to various embodiments, the functionality of the server computer 102 may be provided by one or more server computers, one or more desktop computers, one or more mobile telephones, one or more laptop computers, one or more other computing systems, combinations thereof, or the like. It should be understood that the functionality of the server computer 102 can be provided by a single device, by two or more similar devices, and/or by two or more dissimilar devices. For purposes of describing the concepts and technologies disclosed herein, the server computer 102 is described herein as a server computer such as an application server or web server. It should be understood that this embodiment is illustrative, and should not be construed as being limiting in any way.

The server computer 102 can execute an operating system (not labeled in FIG. 1) and one or more application programs such as, for example, a global analytic engine 106. The operating system can include a computer program for controlling the operation of the server computer 102. The global analytic engine 106 can include an executable program that can be configured to execute on top of the operating system to provide various functions as illustrated and described herein. Prior to explaining the functionality of the global analytic engine 106, the other elements of the operating environment 100 shown in FIG. 1 will be disclosed. It should be noted that although the global analytic engine 106 is illustrated as being hosted by the server computer 102, it should be understood that the global analytic engine 106 may be embodied as a stand-alone device and/or hosted by other devices or components thereof operating as part of or in communication with the network 104 and/or the server computer 102. As such, the illustrated embodiment should be understood as being illustrative of only some contemplated embodiments and should not be construed as being limiting in any way.

As shown in FIG. 1, the operating environment 100 can include a computing environment 108. The computing environment 108 can be in communication with and/or a part of the network 104, and therefore can be in communication with the server computer 102 and/or other networked components as illustrated and described herein and/or in the FIGURES. The functionality of the computing environment 108 can be provided, in various embodiments, by one or more components of: one or more data centers, one or more server farms, one or more networked devices, other computing resources, and/or combinations thereof.

In various embodiments, the computing environment 108 can include one or more virtual devices (e.g., virtual machines, one or more virtual storage devices, etc.) that can provide the functionality of the various components of the computing environment 108 as illustrated and described herein. According to some embodiments of the concepts and technologies disclosed herein, the computing environment 108 does not include virtual computing resources. According to some other embodiments of the concepts and technologies disclosed herein, the computing environment 108 does include virtual computing resources. It should be understood that this example is illustrative, and therefore should not be construed as being limiting in any way.

As shown in FIG. 1, the computing environment 108 can include one or more computers 110A-N (hereinafter collectively and/or generically referred to as "computers 110"). One or more of the computers 110 can include a respective processor or processing component (not separately illustrated in FIG. 1). One or more of the computers 110 also can include respective memory resources or devices ("memory") 112A-N (hereinafter collectively and/or generically referred to as "memory 112"). The memory 112 can store data as is generally understood. Thus, a memory 112 of a particular computer 110 can store applications, application data, and/or other information and/or data such that the computer 110 (or a processor or processing component thereof) can access the data and/or perform operations on the data. It should be understood that this example is illustrative, and therefore should not be construed as being limiting in any way.

According to various embodiments of the concepts and technologies disclosed herein, the computers 110 can store various applications, functions, and/or data in their respective memory 112 to provide the functionality illustrated and described herein. In particular, as shown in FIG. 1, the computers 110 can store one or more virtual functions 114A-N (hereinafter collectively and/or generically referred to as "virtual functions 114"). The virtual functions 114 can include one or more virtual network functions and/or virtual service functions for providing an application, a service, and/or a component thereof. It should be understood that the multiple instances of virtual functions 114 shown in FIG. 1 may all be the same or may differ from one another (e.g., the virtual function 114A may be the same as the virtual function 114B and/or the virtual function 114A may not be the same as the virtual function 114B). It should be understood that this example is illustrative, and therefore should not be construed as being limiting in any way.

As shown in FIG. 1, various embodiments of the concepts and technologies disclosed herein also include storing, in one or more memory 112 of the one or more computers 110, one or more test access point 116A-N (hereinafter collectively and/or generically referred to as "test access points 116"). According to various embodiments of the concepts and technologies disclosed herein, the test access point 116 illustrated and described herein can include a virtual test access point (whereas test access points typically are provided in networking as hardware devices). In particular, the test access points 116 can be provided by a software process and/or a microservice component inside a virtual function 114. The test access points 116 can collect on-demand raw data from the control plane and/or from the user plane based on the criteria instructed by the global analytic engine 106 and/or a native analytic engine (as explained below). The test access points 116 can be configured to correlate control plane and user plane data and/or to provide correlation keys to build the local call flows by the native analytic engine. Thus, as shown in FIG. 1, the test access points 116 can be stored in memory 112 of the respective computers 110 in some embodiments of the concepts and technologies disclosed herein. It should be understood that this example is illustrative, and therefore should not be construed as being limiting in any way.

A particular test access point 116 can be configured to capture and/or analyze traffic that is received by, that traverses, and/or that is sent by the virtual function 114 at which the test access point 116 is operating. In particular, the test access points 116 can be configured to recognize any traffic that flows to, from, or through a virtual function 114 (e.g., the test access point 116A can be configured to recognize traffic that flows to, through, or from the virtual function 114A). Instead of intercepting or otherwise accessing the traffic during the flow, however, the test access points 116 of the concepts and technologies disclosed herein are configured to provide an inobtrusive approach to obtaining information relating to the traffic.

Specifically, as shown in FIG. 1, the computers 110 can store one more instances of traffic data 118A-N (hereinafter collectively and/or generically referred to as "traffic data 118"). The traffic data 118 can include data that relates to any traffic going to, through, and/or from the virtual functions 114. Thus, for example, the traffic data 118A can correspond to traffic that flows to, from, or through the virtual function 114A. It should be understood that this example is illustrative, and therefore should not be construed as being limiting in any way. The traffic data 118 can be stored in the memory 112 as part of the flow of data to, through, and/or from the associated virtual function 114. Thus, for example, an instance of data that is to be operated on by a particular virtual function 114 can flow to the associated computer 110 and can be stored by the computer 110 in the memory 112 as the traffic data 118. Then, the traffic data 118 can be operated on by the virtual function 114 and potentially stored again as the traffic data 118.

The traffic data 118 therefore can be stored in the memory 112 and does not need to be "intercepted" and/or otherwise accessed by the test access point 116 as would be the case in a traditional network environment. Instead, embodiments of the concepts and technologies disclosed herein allow the test access point 116 to access the traffic data 118 from memory 112, and then the traffic data can be analyzed as will be explained in more detail below. Thus, no encryption, decryption, etc. are needed by the test access point 116 to access the traffic data 118, according to embodiments of the concepts and technologies disclosed herein, as the test access point 116 is stored in the same memory as the traffic data 118. As explained in more detail herein, the traffic data 118 can be used for monitoring, network analysis, network planning, and/or other purposes. It should be understood that this example is illustrative, and therefore should not be construed as being limiting in any way.

The computers 110 also can store (e.g., in the memory 112) one or more instances of a native analytic engine 120A-N (hereinafter collectively and/or generically referred to as "native analytic engines 120"). The native analytic engine 120 can be configured to analyze the traffic data 118

(obtained by the test access point 116). In some embodiments, the native analytic engine 120 can be configured to analyze certain types, categories, or instances of traffic data 118 (as will be explained in more detail below) and/or to instruct the test access point 116 to capture certain types, categories, or instances of traffic data 118. It should be understood that this example is illustrative, and therefore should not be construed as being limiting in any way.

According to various embodiments of the concepts and technologies disclosed herein, the native analytic engine 120 can include a software process and/or a microservice component inside a network function instance such as the virtual function 114. The native analytic engine 120 can support protocol analyzing and big data analytics business logics. The native analytic engine 120 also can obtain correlated raw data from the native probe component (the test access point 116) and the business logic data from call processing microservices of the network function (e.g., the virtual function 114).

The native analytic engine 120 also can generate network event records from the correlated raw data provided by the native probe component, based on application filter criteria (which can be inserted in some embodiments through an exposure function as will be explained in more detail below). The native analytic engine 120 also can be configured to generate call state machine event records from the virtual function 114 business logic (as provided by the virtual function 114 call processing stacks and state machines). The native analytic engine 120 also can correlate both types of event data records to generate a holistic view of network events at some point of time. This can be important, in some embodiments, if a network interface cause code defined by 3GPP standards may not be able to provide the true insights on where the call process stack is failed inside a vendor's application software process. In such an example case, the correlated insights can expose the internal call processing business logic flaws during the code development. It should be understood that this example is illustrative, and therefore should not be construed as being limiting in any way.

The native analytic engine 120 can interface with an external analysis engine such as the global analytic engine 106 to define data collection criteria, packet filters, correlation keys, and the like. The native analytic engine 120 also can be configured to report to the global analytic engine 106 with event data with one or more layers of details. The native analytic engine 120 therefore can be configured to report only the necessary information and to provide different levels of summary data, instead of just raw traffic to the global analytic engine 106.

According to various embodiments of the concepts and technologies disclosed herein, one or more of the native analytic engines 120 can analyze the traffic data 118. Based on the analysis, one or more of the native analytic engines 120 can generate one or more instances of analytic information, which is labeled in FIG. 1 as probe data 122. The probe data 122 therefore can correspond to one or more instances of data and/or information that can be generated by the native analytic engine 120. One or more instances of probe data 122 can be reported, sent, or otherwise provided to a data lake 124 by the computing environment 108 (or more particularly by one or more components thereof such as the native analytic engine 120).

The native analytic engine 120 can be configured to store data in the data lake 124. In various embodiments, the native analytic engine 120 can store the data in the data lake 124 with correlation keys. In some embodiments, the native analytic engine 120 can store the data in the data lake 124 with raw packet flows. The volume of data stored in the data lake 124 by the native analytic engine 120 can be controllable and can be scalable due to the cloud native architecture of the native virtual probes 136 in various embodiments.

According to various embodiments, the data lake 124 can be used to store all historical raw data and event records, per a request from operations and/or from the global analytic engine 106. The native analytic engines 120 in each virtual function 114 can provide the correlation keys along with the data and the events. The global analytic engine 106 can obtain the historical data and events from the data lake 124 and correlate data from different sources for an end-to-end post-call processing view. It should be understood that this example is illustrative, and therefore should not be construed as being limiting in any way.

According to various embodiments, the data lake 124 can be stored in one or more computing devices 126. In some embodiments, the one or more computing device 126 can include a memory resource and a processing resource, and the data lake 124 can be stored in the memory resource. It should be understood that this example is illustrative, and therefore should not be construed as being limiting in any way. As shown in FIG. 1, the probe data 122 can be provided to the data lake 124 as part of the communications that can be exchanged between the computing environment 108 and the computing device 126. It should be understood that this example is illustrative, and therefore should not be construed as being limiting in any way.

According to various embodiments of the concepts and technologies disclosed herein, the data lake 124 can include a repository of data that can be stored in any desired format (e.g., raw data, data files, objects, structured data, semi-structured data, unstructured data, binary data, combinations thereof, or the like). The data lake 124 illustrated in FIG. 1 also can include, in some embodiments, one or more data marts, one or more databases, one or more data stores, and/or one or more other file systems or data repositories. According to some implementations of the concepts and technologies disclosed herein, the data lake 124 can receive the one or more probe data 122 and store the probe data 122 in the data lake 124. In some embodiments, multiple instances of the probe data 122 can be stored as or as a part of the data lake 124. It should be understood that this example is illustrative, and therefore should not be construed as being limiting in any way.

As shown in FIG. 1, the computing device 126 can include or host a network exposure function 128. The network exposure function 128 can be configured to provide a secure interface between the data lake 124 and the global analytic engine 106 (and/or the server computer 102 that hosts the global analytic engine 106). The network exposure function 128 also can be configured to provide a secure interface between the data lake 124 and the native analytic engines 120 (or the computing environment 108 and/or components thereof that host the native analytic engines 120). Thus, the network exposure function 128 can provide, effectively, a secure interface between the server computer 102 and the native analytic engines 120. It should be understood that this example is illustrative, and therefore should not be construed as being limiting in any way.

According to various embodiments, the network exposure function 128 can provide an open and secure API interface between the native analytic engines 120 and the global analytic engine 106. The global analytic engine 106 therefore can influence, through the network exposure function 128, the data type, level of details, and customized key performance indicators that should be collected. The global analytic engine 106 can be configured to program, through the network exposure function 128, new analytic logics into the native analytic engines 120. The native analytic engines 120 can be configured to report the required data and event records to the global analytic engine 106 through the network exposure function 128. The native analytic engines 120 can configure the test access points 116 regarding the data and data types to be collected and can configure the event types that should be correlated and generated, based on guidance provided by the global analytic engine 106 through the network exposure function 128.

In some embodiments of the concepts and technologies disclosed herein, the network exposure function 128 can include an application programming interface that can provide an open, yet secure, channel of communication (e.g., between the data lake 124 and the server computer 102 and/or between the data lake 124 and the native analytic engines 120). In some embodiments of the concepts and technologies disclosed herein, the network exposure function 128 can include one or more tools or resources (e.g., the application programming interface and/or other tools or resources) that can be included in an operating system of the computing device 126 and/or that can be hosted by the computing device 126. Regardless of how the network exposure function 128 is provided in the operating environment 100, it can be appreciated that the network exposure function 128 can enable secure and open communications between the data lake 124 and the server computer 102 and/or the computing environment 108 (or components thereof such as the native analytic engines 120).

The global analytic engine 106 can be configured to request the probe data 122 from one or more (or all) of the native analytic engines 120. Specifically, the server computer 102 can, by way of executing the global analytic engine 106, specify types of data that are to be collected by the test access points 116 and/or analyzed by the native analytic engines 120 and/or provided to the data lake 124 as the probe data 122. In some embodiments, for example, the global analytic engine 106 can specify a type of data to be collected by the test access points 116; a level of detail associated with the data to be collected by the test access points 116; specific measures of performance (e.g., key performance indicators ("KPIs")) that are to be collected by the test access points 116 and/or that are to be determined by the native analytic engines 120; etc. The global analytic engine 106 can create one or more requests or calls ("data requests") 130. In some embodiments, the data requests 130 can be created via the network exposure function 128 and communicated to the computing environment 108 and/or a component thereof as part of the communications exchanged between the computing device 126 and the computing environment 108. It should be understood that this example is illustrative, and therefore should not be construed as being limiting in any way.

The test access points 116 can be configured, in some embodiments, by the data requests 130. In some other embodiments, the native analytic engines 120 can be configured by the data requests 130 to only analyze certain types of traffic data 118. Regardless of whether the configuration using the data requests 130 occurs at the test access points 116 (thereby affecting collection of the traffic data 118) and/or at the native analytic engines 120 (thereby affecting analysis of the traffic data 118), the data requests 130 can affect what type of information is provided to the data lake 124 as the probe data 122, in some embodiments.

The global analytic engine 106 can be configured to access the data lake 124 and to perform analysis on the data lake 124. Specifically, the global analytic engine 106 can be configured to access the data lake 124 via the network exposure function 128 to obtain data from the data lake 124 that is to be analyzed by the global analytic engine 106. In some embodiments, the global analytic engine 106 can access all of the data in the data lake 124, while in other embodiments, the global analytic engine 106 can be configured to request only particular types, instances, categories, or other portions of the data in the data lake 124 (e.g., these parameters may be set in a manner that can be, but is not necessarily, similar to the manner in which the data request 130 is created). The global analytic engine 106 can analyze the requested data to determine how the computing environment 108 is performing, etc. It should be understood that this example is illustrative, and therefore should not be construed as being limiting in any way.

According to various embodiments of the concepts and technologies disclosed herein, the operating environment 100 also can include an instantiation device 132. The instantiation device 132 can correspond to a computing device that includes a memory and processor. The processor can execute one or more applications or services stored in the memory to perform various functions. In some embodiments, the instantiation device 132 can execute an instantiation service 134. The instantiation service 134 can be configured to create a native virtual probe 136.

As used herein and in the claims, the phrase "native virtual probe" and variants thereof (including the illustrated and described native virtual probe 136), can be used to refer to an instance of the test access point 116 and an instance of the native analytic engine 120. The test access point 116 and the native analytic engine 120 can work together to obtain and analyze traffic data 118, and to provide probe data 122 to the computing device 126 as illustrated and described herein. Thus, the native virtual probe 136 can include a logical grouping of these two elements (the native analytic engine 120 and the test access point 116), a tightly coupled pairing of these two elements, and/or other cooperative arrangements between these two elements. It should be understood that these examples are illustrative, and therefore should not be construed as being limiting in any way.

In some embodiments, the native virtual probe 136 can be created as part of a service or application, though this is not necessarily the case. In some embodiments of the concepts and technologies disclosed herein, the instantiation device 132 can store images 138. The images 138 can be used to deploy the native virtual probes 136. In various embodiments of the concepts and technologies disclosed herein, the images 138 can include one or more image components. For example, an image 138 can include a first image component that can correspond to a service (or virtual function 114) and a second image component can correspond to the native virtual probe 136 (e.g., the test access point 116 and the native analytic engine 120). In particular, the image 138 can include software that, when deployed by the instantiation device 132 to a computing device or resource (e.g., a virtual machine operating on the computing environment 108), causes the computing environment 108 to provide the native virtual probes 136. In some embodiments, the native virtual probe 136 can be a part or component of a service or application that is instantiated or deployed by the instantiation device 132, and as such, the images 138 can include images of services that include the native virtual probes 136, in some embodiments. It should be understood that these examples are illustrative, and therefore should not be construed as being limiting in any way.

In practice, the instantiation device 132 (or the instantiation service 134) can receive a request for a service or application. The request for the service or application can be created via a portal, received via an API, and/or otherwise made with and/or received by the instantiation service 134. The instantiation service 134 can access the images 138 to obtain an image for the requested service. According to various embodiments of the concepts and technologies disclosed herein, the requested service can include a virtual function 114 and a native virtual probe 136, which can include a test access point 116 and a native analytic engine 120. The instantiation service 134 can be configured to deploy the image 138 to the computing environment 108 to create the service. In some embodiments, the instantiation service 134 can instantiate the service or can trigger deployment and/or instantiation of the service by other entities. It should be understood that this example is illustrative, and therefore should not be construed as being limiting in any way.

The native virtual probes 136 can be configured to operate in the service, in some embodiments; in the same computing environment 108 as the service operates in; and/or otherwise in communication with and/or having access to a memory 112 in which traffic data 118 associated with the service (or at least a virtual function 114 of that service) is stored. According to various embodiments, a global analytic engine 106 can be configured to specify types of traffic data 118 that are to be captured by the native virtual probes 136. In particular, the global analytic engine 106 can create data requests 130 that specify data, types of data, categories of data, and/or other parameters relating to what data and/or information is to be captured by the native virtual probes 136. This information can be passed to the computing environment 108 via the network exposure function 128 of the computing device 126. The information can be used by the native virtual probes 136 (e.g., by modifying the types of data captured by the test access point 116 and/or by modifying what data is analyzed by the native analytic engine 120). The native analytic engine 120 can analyze the traffic data 118 and provide probe data 122 to the computing device 126 for storage in the data lake 124.

The global analytic engine 106 can access the data lake 124 and perform analysis on the data in the data lake 124 to obtain insights into network interface information, business logic data, and other information handled by the virtual functions 114. In particular, the test access points 116 can collect the traffic data 118, which can be analyzed to determine how traffic flows to, through, and/or from the virtual functions 114, internal calls at the virtual functions 114, what business logic operations occur on the data at the virtual functions 114, and the like. Similarly, the data lake 124 can be analyzed to correlate virtual function 114 call processing events with network interface information (e.g., interface protocol information) to correlate without the use of external correlation engines.

The global analytic engine 106 therefore can be configured to analyze the data lake 124 to generate network event records from the correlated raw data, to generate state machine event records from virtual function 114 business logic (e.g., call processing stack and/or state machine information), to correlate both types of event data records to generate a holistic view of network events at some time. For example, correlated insights can expose internal call processing business logic flaws during code development to detect failures, etc.

The native virtual probes illustrated and described herein can include an onboard test access point inside the virtual function software components, as well as a native analytic engine inside the virtual function software components. These two components can collectively provide the functionality of the native virtual probes. Probe insertion (e.g., instantiation of the test access point and the native analytic engine 120) can be part of the deployment process for a virtual function 114. As the virtual function 114 grows, e.g., as new instances of the virtual function 114 are deployed, the number of native virtual probes 136 also can grow organically. Because the native virtual probe 136 can be deployed to the same memory 112 that hosts the virtual function 114, the native virtual probe can have visibility of both related network interface data and internal call processing business logic data. The native virtual probe 136 also can be able to correlate call processing business logic events (at the virtual function 114) with network interface protocol data without any external devices and/or operations. This approach can save efforts and costs of external correlation engines and prevent potential false conclusion of external correlation engines. It should be understood that this example is illustrative, and therefore should not be construed as being limiting in any way.

The native virtual probes 136 illustrated and described herein can result in reduced cost relative to vTAPs and/or physical TAPs. In particular, the native virtual probes 136 (and the components thereof, the test access points 116 and the native analytic engines 120) can be provided as software components that can be deployed with the virtual functions 114. Thus, the native virtual probes 136 illustrated and described herein can require no external probe cost to operate, no external probe growth cost can be expected in the future, and the native virtual probes 136 can provide efficient packet processing and analytics (i.e., no packet duplication or mirroring), thereby realizing savings in computing resources and reduced scaling costs. Also, no external touchpoints are required, no traffic mirroring and/or duplication may be required, and packets may be processed only once per virtual function since the native virtual probe 136 can access the raw data directly from memory 112.

FIG. 1 illustrates one server computer 102, one network 104, one computing environment 108, three computers 110, one data lake 124, one computing device 126, and one instantiation device 132. It should be understood, however, that various implementations of the operating environment 100 can include zero, one, or more than one server computer 102; zero, one, or more than one network 104; zero, one, or more than one computing environment 108; zero, one, two, three, or more than three computers 110; zero, one, or more than one data lake 124; zero, one, or more than one computing device 126; and/or zero, one, or more than one instantiation device 132. As such, the illustrated embodiment should be understood as being illustrative, and should not be construed as being limiting in any way.

Figure 2:
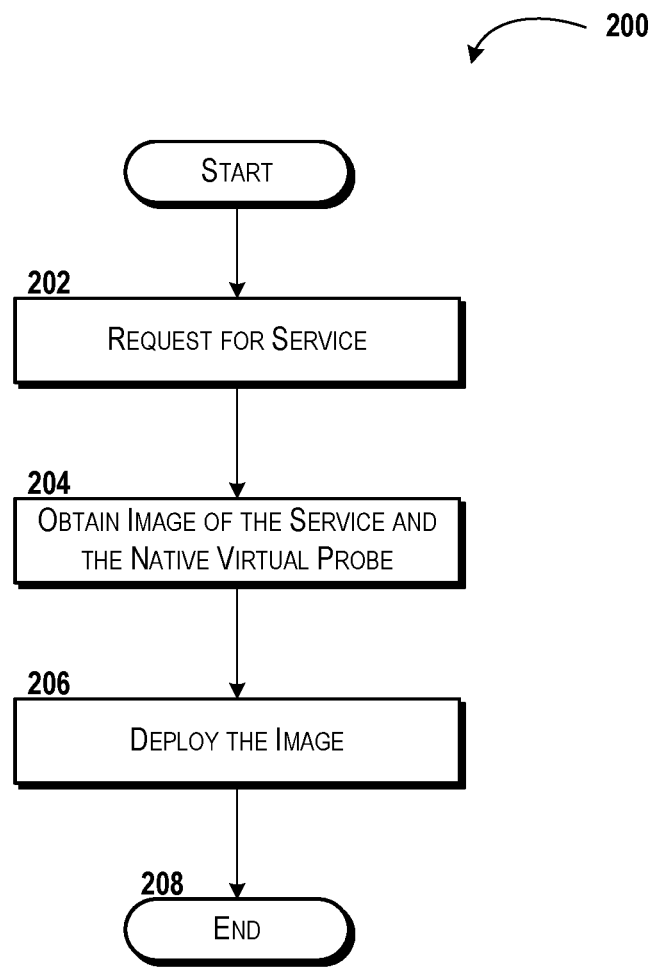
FIG. 2 is a flow diagram showing aspects of a method for creating a native virtual probe, according to an illustrative embodiment of the concepts and technologies described herein.

Turning now to FIG. 2, aspects of a method 200 for creating a native virtual probe will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102, the computer 110, the computing device 126, and/or the instantiation device 132 to perform one or more operations and/or causing the processor to direct other components of the computing system or device to perform one or more of the operations.

For purposes of illustrating and describing the concepts of the present disclosure, the method 200 is described herein as being performed by the instantiation device 132 via execution of one or more software modules such as, for example, the instantiation service 134. It should be understood that additional and/or alternative devices and/or network nodes can provide the functionality described herein via execution of one or more modules, applications, and/or other software including, but not limited to, the instantiation service 134. Thus, the illustrated embodiments are illustrative, and should not be viewed as being limiting in any way.

The method 200 begins at operation 202. At operation 202, the instantiation device 132 can receive a request for a service. The request for the service can be received from various types of entities and/or devices. In some embodiments, as noted above, the request for a service can be received via an API or portal, received as a service call or request, or otherwise received at the instantiation device 132. The request for the service can specify the service that is requested (e.g., functionality of the service that is being requested, a particular virtual function 114 of the service that is being requested, etc.) and native virtual probe 136 that is being requested as part of that service. As noted above, the service can include a native virtual probe 136 in various embodiments.

From operation 202, the method 200 can proceed to operation 204. At operation 204, the instantiation device 132 can obtain an image 138. The image 138 obtained in operation 204 can correspond to the service requested in operation 202, including the native virtual probe 136. In various embodiments of the concepts and technologies disclosed herein, the instantiation device 132 can store images 138 for various services and/or native virtual probes 136. Thus, operation 204 can include accessing a data storage device (e.g., a local or remote memory, a data server, a database, etc.) and identifying, among a plurality of images 138, the image 138 that relates to the service requested in operation 202.

The image 138 obtained in operation 204 can include information that, when loaded to a computing resource (e.g., one of the computers 110), causes the computing resource to host and/or provide the functionality of the service requested in operation 202 and the functionality of the native virtual probe 136 that is created as part of the service. In some embodiments, for example, the image 138 includes instructions for instantiating a virtual function 114 that provides functionality associated with the service, instructions for instantiating a test access point 116 to access traffic data 118 associated with the virtual function 114, and instructions for instantiating a native analytic engine 120. As noted above, the native virtual probe 136 can be provided by the test access point 116 and the native analytic engine 120. It should be understood that this example is illustrative, and therefore should not be construed as being limiting in any way.

From operation 204, the method 200 can proceed to operation 206. At operation 206, the instantiation device 132 can deploy the image 138 obtained in operation 204. In some embodiments, the instantiation device 132 can instantiate the service and the native virtual probe 136. In some other embodiments, the instantiation device 132 can instruct another device to deploy, or trigger deployment of, the image 138 to one or more computer resources to instantiate the service and the native virtual probe 136. It therefore can be appreciated that in some embodiments, the instantiation device 132 can include functionality for providing instantiation of service such as hypervisors, etc. It should be understood that this example is illustrative, and therefore should not be construed as being limiting in any way.

From operation 206, the method 200 can proceed to operation 208. The method 200 can end at operation 208.

Figure 3:
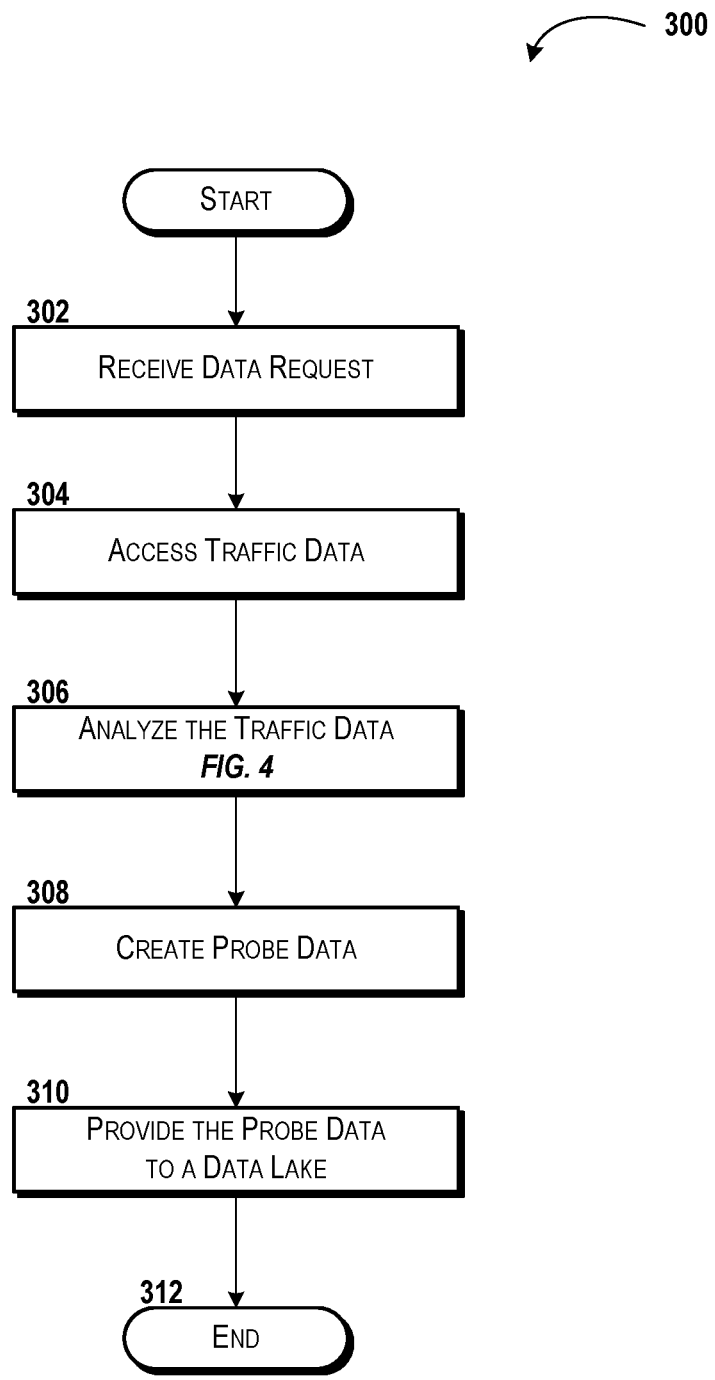
FIG. 3 is a flow diagram showing aspects of a method for using a native virtual probe, according to an illustrative embodiment of the concepts and technologies described herein.

Turning now to FIG. 3, aspects of a method 300 for using a native virtual probe will be described in detail, according to an illustrative embodiment. For purposes of illustrating and describing the concepts of the present disclosure, the method 300 is described herein as being performed by the computer 110 via execution of one or more software modules such as, for example, the virtual function 114, the test access point 116, and/or the native analytic engine 120. It should be understood that additional and/or alternative devices and/or network nodes can provide the functionality described herein via execution of one or more modules, applications, and/or other software including, but not limited to, the virtual function 114, the test access point 116, and/or the native analytic engine 120. Thus, the illustrated embodiments are illustrative, and should not be viewed as being limiting in any way.

The method 300 begins at operation 302. At operation 302, the computer 110 can receive a data request such as the data request 130. The data request received in operation 302 can specify a type of data, a source of data, a category of data, a performance metric, and/or other parameters for data that is to be accessed by the native virtual probe 136. Thus, the data request received in operation 302 can be used to specify what type of traffic data 118 is to be accessed by the test access point 116 and/or what type of traffic data 118 is to be analyzed by the native analytic engine 120.

From operation 302, the method 300 can proceed to operation 304. At operation 304, the computer 110 can access the traffic data 118. According to various embodiments, the computer 110 can access the traffic data 118 using the native virtual probe 136. More particularly, the test access point 116 of the native virtual probe 136 can access the traffic data 118, which can be stored in the memory 112 of computer 110.

Thus, it can be appreciated that the test access point 116 of the native virtual probe 136 can be configured to obtain the traffic data 118 without accessing a traffic flow or other data stream, without requiring encryption and/or decryption, and/or without otherwise operating on the traffic data 118. Rather, the native virtual probe 136 can access the traffic data 118 in operation 304 by performing a simple memory read operation, thereby allowing the native virtual probe 136 to obtain the traffic data 118 quickly and without computation-intensive operations in various embodiments. It should be understood that this example is illustrative, and therefore should not be construed as being limiting in any way.

From operation 304, the method 300 can proceed to operation 306. At operation 306, the computer 110 can analyze the traffic data 118 obtained in operation 304. According to various embodiments, the computer 110 can analyze the traffic data 118 in operation 306 using the native virtual probe 136. More particularly, the computer 110 can analyze the traffic data 118 in operation 306 using the native analytic engine 120. It should be understood that this example is illustrative, and therefore should not be construed as being limiting in any way.

The native analytic engine 120 can analyze the traffic data 118 obtained in operation 304 to correlate control plane and user plane data and/or to provide correlation keys to build the local call flows by the native analytic engine 120. Thus, the native analytic engine 120 can be configured to correlate messaging events and/or traffic events with control plane and/or user plane messaging to identify sources of failures, sourcing of messaging, sources of business logic operations, and/or other sources and/or effects of messaging between and/or in virtual functions 114. Because other types of analysis are possible and are contemplated, it should be understood that these examples are illustrative, and therefore should not be construed as being limiting in any way.

From operation 306, the method 300 can proceed to operation 308. At operation 308, the computer 110 can create probe data 122. The probe data 122 created in operation 308 can correspond to obtaining results from the analysis in operation 306 and providing those results to the data lake 124. Thus, operation 308 can correspond to reporting call flows, messaging, and/or correlation information to the data lake 124. It should be understood that this example is illustrative, and therefore should not be construed as being limiting in any way.

From operation 308, the method 300 can proceed to operation 310. At operation 310, the computer 110 can provide the probe data 122 created in operation 308 to the data lake 124. In some embodiments, the computer 110 can communicate with the data lake 124 via the network exposure function 128 that can be exposed by the computing device 126 that hosts the data lake 124. Thus, operation 310 can correspond to the computer 110 submitting or transmitting the probe data 122 to the data lake 124 via the network exposure function 128. Because the probe data 122 can be provided to the data lake 124 in additional and/or alternative manners, it should be understood that these examples are illustrative, and therefore should not be construed as being limiting in any way.

From operation 310, the method 300 can proceed to operation 312. The method 300 can end at operation 312.

Figure 4:
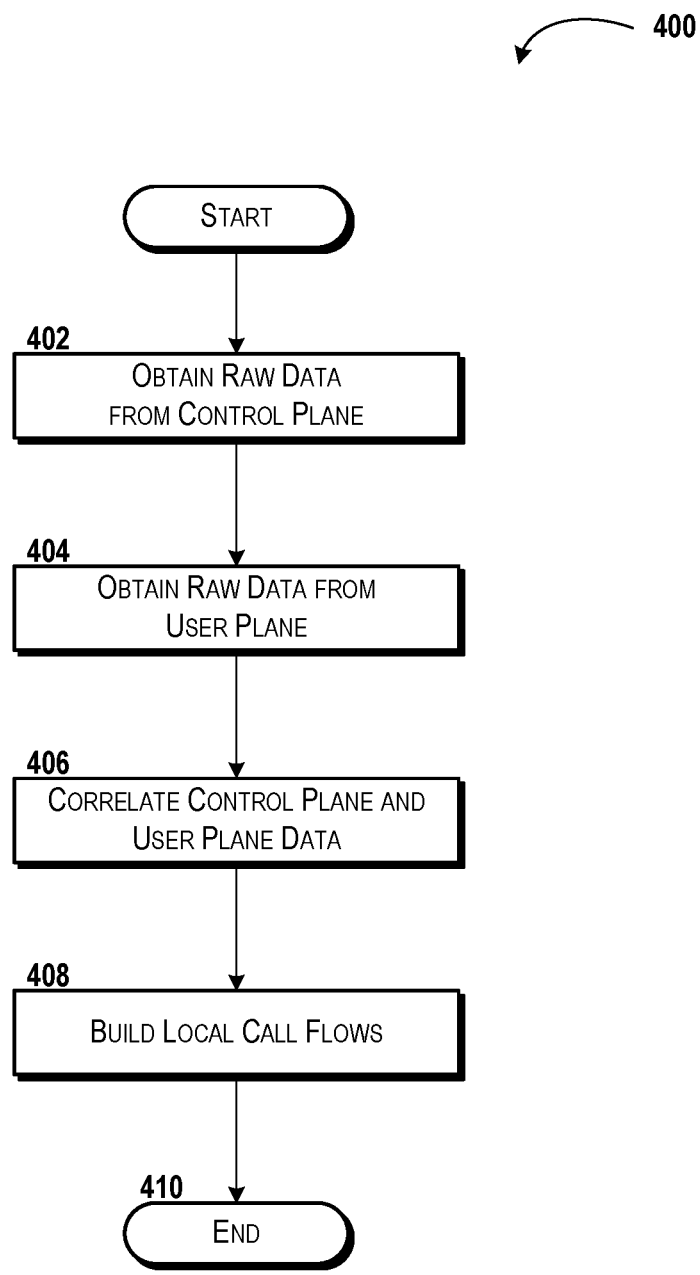
FIG. 4 is a flow diagram showing aspects of a method for analyzing traffic data using a native analytics engine, according to an illustrative embodiment of the concepts and technologies described herein.

Turning now to FIG. 4, aspects of a method 400 for analyzing traffic data using a native analytics engine will be described in detail, according to an illustrative embodiment. For purposes of illustrating and describing the concepts of the present disclosure, the method 400 is described herein as being performed by the computer 110 via execution of one or more software modules such as, for example, the native analytic engine 120. It should be understood that additional and/or alternative devices and/or network nodes can provide the functionality described herein via execution of one or more modules, applications, and/or other software including, but not limited to, the native analytic engine 120. Thus, the illustrated embodiments are illustrative, and should not be viewed as being limiting in any way.

The method 400 begins at operation 402. At operation 402, the computer 110 can obtain raw data from a control plane associated with the computing environment 108. According to various embodiments of the concepts and technologies disclosed herein, the functionality of operation 402 can correspond to the native analytic engine 120 obtaining, from a control plane associated with the computing environment 108, raw data for analysis. In some embodiments, the native analytic engine 120 can obtain the raw data from the control plane using the test access point 116. As noted above, the test access point 116 can be configured to perform a local read operation in the memory 112 of the computer 110 as the test access point 116 can be stored in the memory 112. Thus, in some embodiments, operation 402 can correspond to the native analytic engine 120 instructing the test access point 116 to read control plane data from the memory 112, e.g., to access the traffic data 118 and identify, in the traffic data 118, control plane data. It should be understood that this example is illustrative, and therefore should not be construed as being limiting in any way.

From operation 402, the method 400 can proceed to operation 404. At operation 404, the computer 110 can obtain raw data from a user plane associated with the computing environment 108 and/or, more particularly, with the virtual function 114 stored in the memory 112 of the computer 110. According to various embodiments of the concepts and technologies disclosed herein, the functionality of operation 404 can correspond to the native analytic engine 120 obtaining, from a user plane associated with the computing environment 108, the computer 110, and/or the virtual function 114, raw data for analysis. In some embodiments, the native analytic engine 120 can obtain the raw data from the user plane using the test access point 116. As noted above, the test access point 116 can be configured to perform a local read operation in the memory 112 of the computer 110 as the test access point 116 can be stored in the memory 112. Thus, in some embodiments, operation 404 can correspond to the native analytic engine 120 instructing the test access point 116 to read user plane data from the memory 112, e.g., to access the traffic data 118 and identify, in the traffic data 118, user plane data. It should be understood that this example is illustrative, and therefore should not be construed as being limiting in any way.

From operation 404, the method 400 can proceed to operation 406. At operation 406, the computer 110 can correlate the control plane data obtained in operation 402 with the user plane data obtained in operation 404. From operation 406, the method 400 can proceed to operation 408. At operation 408, the computer 110 can build local call flows based on the correlation information and/or messages created and/or received from the virtual functions 114.

From operation 408, the method 400 can proceed to operation 410. The method 400 can end at operation 410.

Figure 5:
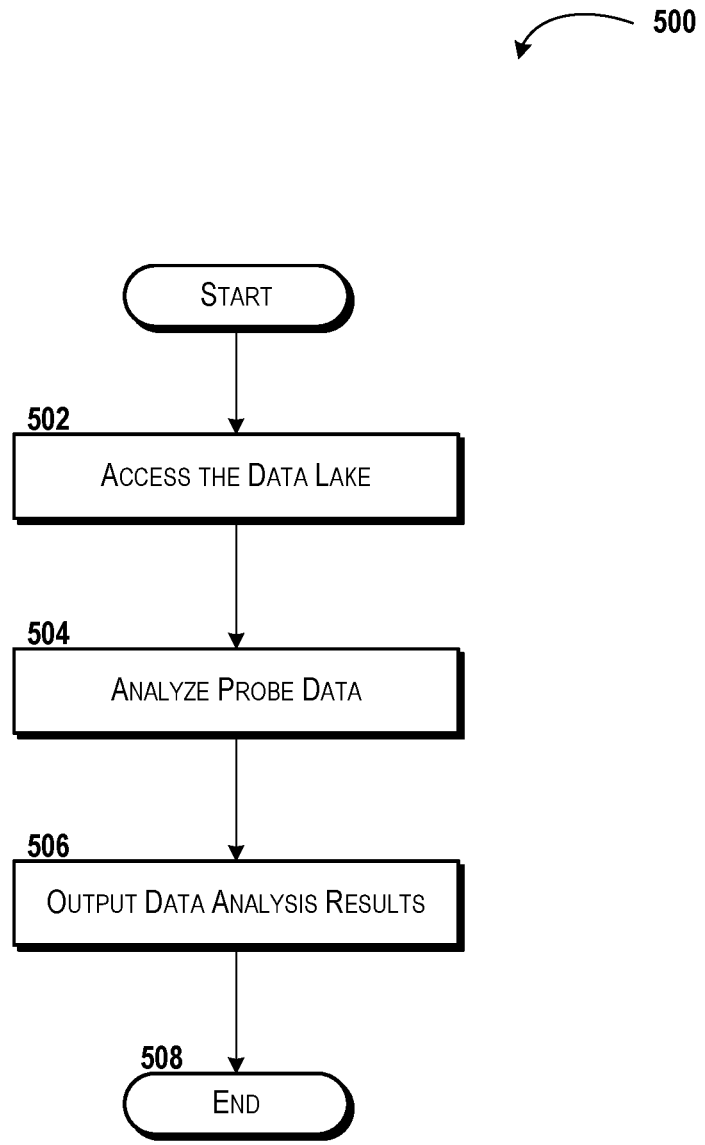
FIG. 5 is a flow diagram showing aspects of a method for analyzing probe data using a global analytics engine, according to an illustrative embodiment of the concepts and technologies described herein.

Turning now to FIG. 5, aspects of a method 500 for analyzing probe data using a global analytics engine will be described in detail, according to an illustrative embodiment. For purposes of illustrating and describing the concepts of the present disclosure, the method 500 is described herein as being performed by the server computer 102 via execution of one or more software modules such as, for example, the global analytic engine 106. It should be understood that additional and/or alternative devices and/or network nodes can provide the functionality described herein via execution of one or more modules, applications, and/or other software including, but not limited to, the global analytic engine 106. Thus, the illustrated embodiments are illustrative, and should not be viewed as being limiting in any way.

The method 500 begins at operation 502. At operation 502, the server computer 102 can access the data lake 124. According to various embodiments, the server computer 102 can access the data lake 124 using the global analytic engine 106. In particular, the server computer 102 can be configured to access the data lake 124 via the network exposure function 128 to create a request for data from the data lake 124. According to various embodiments, the request for data can correspond to a query, a request, a service call, or the like. In some other embodiments, the server computer 102 can access the data lake 124 and search for particular data from the data lake 124.

From operation 502, the method 500 can proceed to operation 504. At operation 504, the server computer 102 can analyze the data accessed in operation 502. In various embodiments, the global analytic engine 106 can perform big data analysis on the data lake 124 to identity correlations and/or trends among the data points collected by the test access points 116 and/or the analyzed data from the native analytic engines 120. The analysis in operation 504 therefore can reveal, among other things, sources of messages, call flows, business logic flows, and/or correlations between messages, traffic, call flows, and/or logic flows in and/or among virtual functions 114.

From operation 504, the method 500 can proceed to operation 506. At operation 506, the server computer 102 can output results from the data analysis in operation 504. The results can indicate, among other things, the correlations among messages and/or business logic flows as noted above.

From operation 506, the method 500 can proceed to operation 508. The method 500 can end at operation 508.

Figure 6:
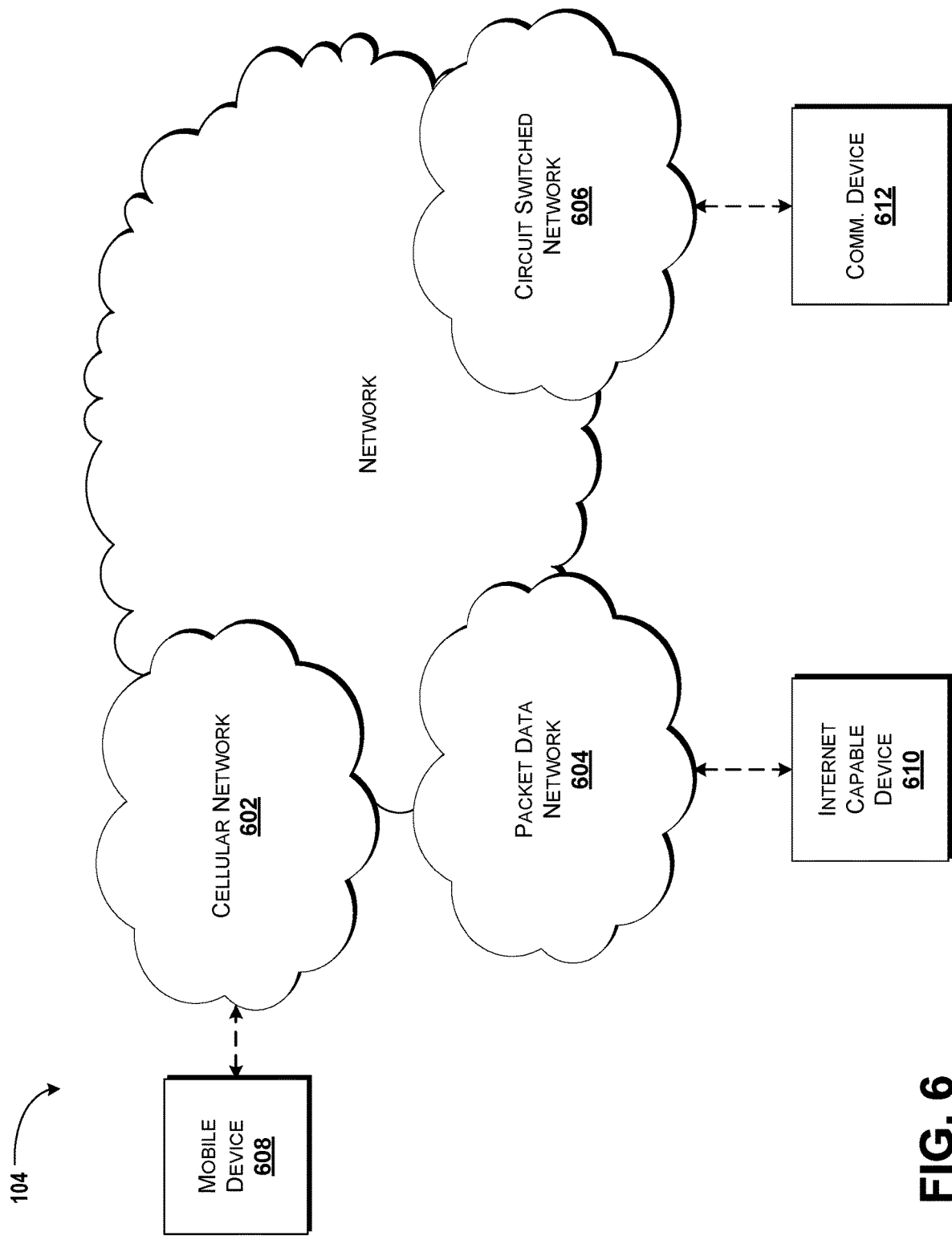
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSDPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the cellular network 602, the packet data network 604, and/or the circuit switched network 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
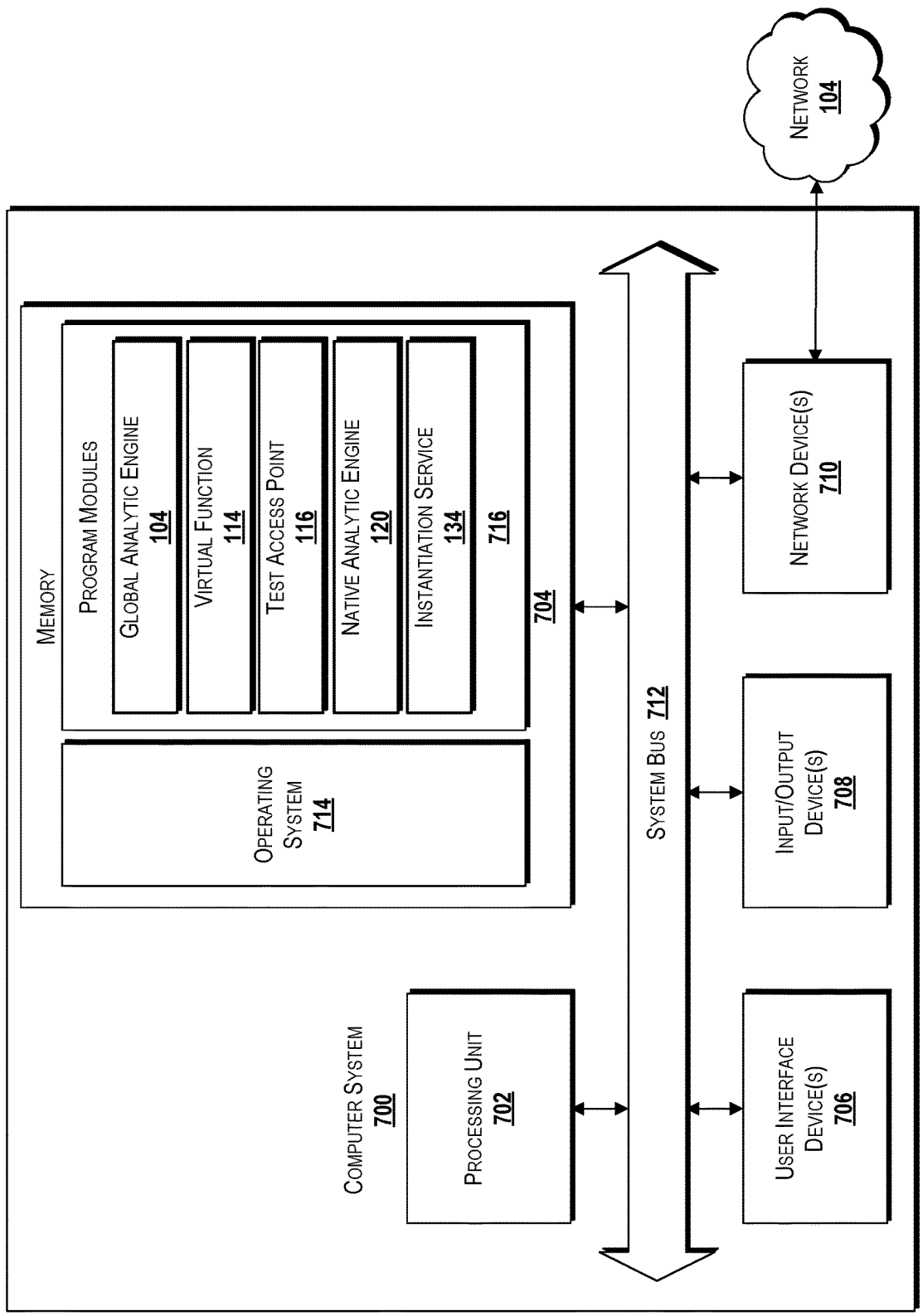
FIG. 7 is a block diagram illustrating an example computer system capable of implementing aspects of the concepts and technologies disclosed herein for creating and using native virtual probes in computing environments, according to some illustrative embodiments of the concepts and technologies described herein.

FIG. 7 is a block diagram illustrating a computer system 700 capable of implementing aspects of the concepts and technologies disclosed herein for creating and using native virtual probes in computing environments, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The system bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 can include one or more of the global analytic engine 106, the virtual function 114, the test access point 116, the native analytic engine 120, and the instantiation service 134. These and/or other programs can be embodied in computer-readable media containing instructions that, when executed by the processing unit 702, perform one or more of the methods 200, 300, 400, and/or 500 described in detail above with respect to FIGS. 2-5 and/or other functionality as illustrated and described herein. It can be appreciated that, at least by virtue of the instructions embodying the methods 200, 300, 400, 500, and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store the traffic data 118, the probe data 122, the data requests 130, the images 138, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
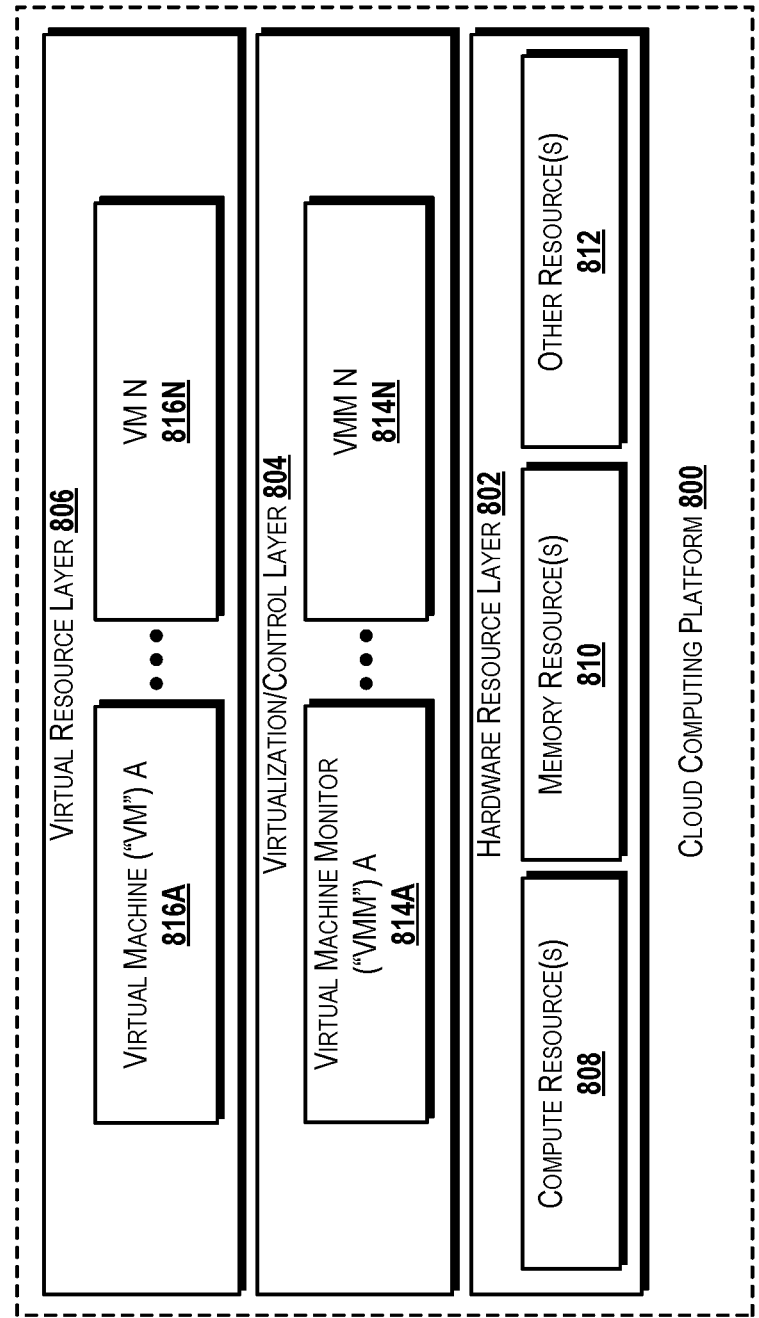
FIG. 8 is a diagram illustrating a computing environment capable of implementing aspects of the concepts and technologies disclosed herein for creating and using native virtual probes in computing environments, according to some illustrative embodiments of the concepts and technologies described herein.

FIG. 8 illustrates a cloud computing platform architecture 800 capable of executing the software components described herein for creating and using native virtual probes in computing environments, according to an illustrative embodiment of the concepts and technologies disclosed herein. Thus, it can be appreciated that in some embodiments of the concepts and technologies disclosed herein, the cloud computing platform architecture 800 illustrated in FIG. 8 can be used to provide the functionality described herein with respect to the server computer 102, the computers 110A-N, and/or the instantiation device 132.

The cloud computing platform architecture 800 thus may be utilized to execute any aspects of the software components presented herein. Thus, according to various embodiments of the concepts and technologies disclosed herein, the global analytic engine 106, the virtual functions 114A-N, the test access points 116A-N, the native analytic engines 120A-N, and the instantiation service 134 can be implemented, at least in part, on or by elements included in the cloud computing platform architecture 800 illustrated and described herein. Those skilled in the art will appreciate that the cloud computing platform architecture 800 illustrated in FIG. 8 is a simplification of but only one possible implementation of an illustrative cloud computing platform, and as such, the cloud computing platform architecture 800 should not be construed as being limiting in any way.

In the illustrated embodiment, the cloud computing platform architecture 800 can include a hardware resource layer 802, a virtualization/control layer 804, and a virtual resource layer 806. These layers and/or other layers can be configured to cooperate with each other and/or other elements of a cloud computing platform architecture to perform operations as will be described in detail herein. While connections are shown between some of the components illustrated in FIG. 8, it should be understood that some, none, or all of the components illustrated in FIG. 8 can be configured to interact with one another to carry out various functions described herein. In some embodiments, the components are arranged so as to communicate via one or more networks such as, for example, the network 104 illustrated and described hereinabove (not shown in FIG. 8). Thus, it should be understood that FIG. 8 and the following description are intended to provide a general understanding of a suitable environment in which various aspects of embodiments can be implemented, and should not be construed as being limiting in any way.

The hardware resource layer 802 can provide hardware resources. In the illustrated embodiment, the hardware resources can include one or more compute resources 808, one or more memory resources 810, and one or more other resources 812. The compute resource(s) 806 can include one or more hardware components that can perform computations to process data, and/or to execute computer-executable instructions of one or more application programs, operating systems, services, and/or other software illustrated and described herein.

According to various embodiments, the compute resources 808 can include one or more central processing units ("CPUs"). The CPUs can be configured with one or more processing cores. In some embodiments, the compute resources 808 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 808 can include one or more discrete GPUs. In some other embodiments, the compute resources 808 can include one or more CPU and/or GPU components that can be configured in accordance with a co-processing CPU/GPU computing model. Thus, it can be appreciated that in some embodiments of the compute resources 808, a sequential part of an application can execute on a CPU and a computationally-intensive part of the application can be accelerated by the GPU. It should be understood that this example is illustrative, and therefore should not be construed as being limiting in any way.

In some embodiments, the compute resources 808 also can include one or more system on a chip ("SoC") components. It should be understood that the SoC component can operate in association with one or more other components as illustrated and described herein, for example, one or more of the memory resources 810 and/or one or more of the other resources 812. In some embodiments in which an SoC component is included, the compute resources 808 can be or can include one or more embodiments of the SNAPDRAGON brand family of SoCs, available from QUALCOMM of San Diego, Calif.; one or more embodiment of the TEGRA brand family of SoCs, available from NVIDIA of Santa Clara, Calif.; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Tex.; one or more customized versions of any of the above SoCs; and/or one or more other brand and/or one or more proprietary SoCs.

The compute resources 808 can be or can include one or more hardware components arranged in accordance with an ARM architecture, available for license from ARM HOLDINGS of Cambridge, United Kingdom. Alternatively, the compute resources 808 can be or can include one or more hardware components arranged in accordance with an x86 architecture, such as an architecture available from INTEL CORPORATION of Mountain View, Calif., and others. Those skilled in the art will appreciate the implementation of the compute resources 808 can utilize various computation architectures and/or processing architectures. As such, the various example embodiments of the compute resources 808 as mentioned hereinabove should not be construed as being limiting in any way. Rather, implementations of embodiments of the concepts and technologies disclosed herein can be implemented using compute resources 808 having any of the particular computation architecture and/or combination of computation architectures mentioned herein as well as other architectures.

Although not separately illustrated in FIG. 8, it should be understood that the compute resources 808 illustrated and described herein can host and/or execute various services, applications, portals, and/or other functionality illustrated and described herein. Thus, the compute resources 808 can host and/or can execute the global analytic engine 106, the virtual functions 114, the test access points 116, the native analytic engines 120, the instantiation service 134, and/or other applications or services illustrated and described herein.

The memory resource(s) 810 can include one or more hardware components that can perform or provide storage operations, including temporary and/or permanent storage operations. In some embodiments, the memory resource(s) 810 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 808, subject to the definition of "computer storage media" provided above (e.g., as excluding waves and signals per se and/or communication media as defined in this application).

Although not illustrated in FIG. 8, it should be understood that the memory resources 810 can host or store the various data illustrated and described herein including, but not limited to, the traffic data 118, the probe data 122, the data lake 124, the probe data 122, the images 138, and/or other data, if desired. It should be understood that this example is illustrative, and therefore should not be construed as being limiting in any way.

The other resource(s) 812 can include any other hardware resources that can be utilized by the compute resources(s) 806 and/or the memory resource(s) 810 to perform operations. The other resource(s) 812 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 802 can be virtualized by one or more virtual machine monitors ("VMMs") 814A-814K (also known as "hypervisors;" hereinafter "VMMs 814"). The VMMs 814 can operate within the virtualization/control layer 804 to manage one or more virtual resources that can reside in the virtual resource layer 806. The VMMs 814 can be or can include software, firmware, and/or hardware that alone or in combination with other software, firmware, and/or hardware, can manage one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816A-816N (hereinafter "VMs 816").

Based on the foregoing, it should be appreciated that systems and methods for creating and using native virtual probes in computing environments have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, when executed by the processor, cause the processor to perform operations comprising
obtaining an image of a service that comprises a virtual function, wherein the virtual function is to be monitored by a native virtual probe, and wherein the image comprises a first image component that corresponds to the virtual function and a second image component that corresponds to the native virtual probe, and
triggering deployment of the image, wherein the deployment of the image results in instantiation of the virtual function in a computing environment and instantiation of the native virtual probe in the computing environment.

2. The system of claim 1, wherein the virtual function is deployed to the memory, wherein the native virtual probe is deployed to the memory, and wherein traffic data for the virtual function is stored in the memory.

3. The system of claim 2, wherein the native virtual probe comprises a test access point and a native analytic engine.

4. The system of claim 3, wherein the test access point obtains the traffic data by reading the traffic data from the memory without duplicating the traffic data.

5. The system of claim 1, wherein the native virtual probe is used to obtain traffic data associated with the virtual function.

6. The system of claim 5, wherein obtaining the traffic data comprises:
receiving a data request that defines the traffic data to be collected for the virtual function;
accessing the traffic data from the memory;
analyzing the traffic data;
creating probe data; and
providing the probe data to a data lake.

7. The system of claim 6, wherein analyzing the traffic data comprises:
obtaining control plane data from a control plane of the computing environment;
obtaining user plane data from a user plane of the computing environment;
correlating the control plane data and the user plane data; and
building local call flows for the virtual function based on correlating the control plane data and the user plane data.

8. The system of claim 7, wherein the computer-executable instructions, when executed by the processor, cause the processor to perform operations further comprising:
accessing the data lake using a global analytic engine;
analyzing the probe data stored in the data lake; and
outputting a data analysis result based on the analyzing of the probe data, wherein the global analytic engine accesses the data lake via a network exposure function.

9. The system of claim 8, wherein the data request is obtained via the network exposure function.

10. A method comprising:
- obtaining, at an instantiation device, an image of a service that comprises a virtual function, wherein the virtual function is to be monitored by a native virtual probe, and wherein the image comprises a first image component that corresponds to the virtual function and a second image component that corresponds to the native virtual probe; and
- triggering, by the instantiation device, deployment of the image, wherein the deployment of the image results in instantiation of the virtual function in a computing environment and instantiation of the native virtual probe in the computing environment.

11. The method of claim 10, wherein the virtual function is deployed to a memory, wherein the native virtual probe is deployed to the memory, and wherein traffic data for the virtual function is stored in the memory.

12. The method of claim 11, wherein the native virtual probe comprises a test access point and a native analytic engine, and wherein the test access point obtains the traffic data by reading the traffic data from the memory without duplicating the traffic data.

13. The method of claim 12, wherein obtaining the traffic data comprises:
- receiving a data request that defines the traffic data to be collected for the virtual function;
- accessing the traffic data from the memory;
- analyzing the traffic data;
- creating probe data; and
- providing the probe data to a data lake.

14. The method of claim 13, wherein analyzing the traffic data comprises:
- obtaining control plane data from a control plane of the computing environment;
- obtaining user plane data from a user plane of the computing environment;
- correlating the control plane data and the user plane data; and
- building local call flows for the virtual function based on correlating the control plane data and the user plane data.

15. The method of claim 13, further comprising:
- accessing the data lake using a global analytic engine;
- analyzing the probe data stored in the data lake; and
- outputting a data analysis result based on the analyzing of the probe data, wherein the global analytic engine accesses the data lake via a network exposure function.

16. A computer storage medium having computer-executable instructions stored thereon that, when executed by a processor, cause the processor to perform operations comprising:
- obtaining, at an instantiation device, an image of a service that comprises a virtual function, wherein the virtual function is to be monitored by a native virtual probe, and wherein the image comprises a first image component that corresponds to the virtual function and a second image component that corresponds to the native virtual probe; and
- triggering deployment of the image, wherein the deployment of the image results in instantiation of the virtual function in a computing environment and instantiation of the native virtual probe in the computing environment.

17. The computer storage medium of claim 16, wherein the virtual function is deployed to a memory, wherein the native virtual probe is deployed to the memory, and wherein traffic data for the virtual function is stored in the memory.

18. The computer storage medium of claim 17, wherein the native virtual probe comprises a test access point and a native analytic engine, and wherein the test access point obtains the traffic data by reading the traffic data from the memory without duplicating the traffic data.

19. The computer storage medium of claim 18, wherein obtaining the traffic data comprises:
- receiving a data request that defines the traffic data to be collected for the virtual function;
- accessing the traffic data from the memory;
- analyzing the traffic data;
- creating probe data; and
- providing the probe data to a data lake.

20. The computer storage medium of claim 19, wherein analyzing the traffic data comprises:
- obtaining control plane data from a control plane of the computing environment;
- obtaining user plane data from a user plane of the computing environment;
- correlating the control plane data and the user plane data; and
- building local call flows for the virtual function based on correlating the control plane data and the user plane data.

* * * * *